United States Patent
Chen et al.

(10) Patent No.: US 6,180,130 B1
(45) Date of Patent: Jan. 30, 2001

(54) VITAMIN E PREPARATIONS FOR BEVERAGE APPLICATIONS

(75) Inventors: Chyi-Cheng Chen, Wayne; Jeffrey Mark Mix, Lincoln Park; Sriram Jayanthan Ramanathan, Nutley, all of NJ (US)

(73) Assignee: Roche Vitamins Inc., Parsippany, NJ (US)

( * ) Notice: Under 35 U.S.C. 154(b), the term of this patent shall be extended for 0 days.

(21) Appl. No.: 08/944,664

(22) Filed: Oct. 6, 1997

Related U.S. Application Data

(60) Provisional application No. 60/027,758, filed on Oct. 7, 1996.

(51) Int. Cl.⁷ .............................. A61K 47/00; A23L 1/30
(52) U.S. Cl. .............................................. 424/439; 426/72
(58) Field of Search ........................... 424/439; 514/458, 514/772, 777, 167, 168, 725; 426/72, 73, 331, 654, 569; 552/653; 560/260; 568/378, 668, 447, 824

(56) References Cited

U.S. PATENT DOCUMENTS

| | | | | |
|---|---|---|---|---|
| 3,253,992 | * | 5/1966 | Brooks | 514/168 |
| 3,359,167 | * | 12/1967 | Timreck | 514/725 |
| 3,932,634 | * | 1/1976 | Kardys | 514/168 |
| 4,170,229 | * | 10/1979 | Olson | 601/160 |
| 4,368,204 | * | 1/1983 | Sato et al. | 514/400 |
| 4,420,471 | * | 12/1983 | Elton et al. | 424/49 |
| 4,568,667 | * | 2/1986 | Shirakawa et al. | 514/26 |
| 4,835,002 | * | 5/1989 | Wolf et al. | 426/590 |

FOREIGN PATENT DOCUMENTS

| | | | |
|---|---|---|---|
| 27938 | * | 8/1963 | (DE) . |
| 166011 | * | 3/1993 | (DK) . |
| 4300830 | * | 10/1992 | (JP) . |
| 1113123 | * | 9/1984 | (SU) . |
| 94/06310 | * | 3/1994 | (WO) . |
| 95/24832 | * | 9/1995 | (WO) . |
| 97/10725 | * | 3/1997 | (WO) . |

* cited by examiner

*Primary Examiner*—Sandra E. Saucier
(74) *Attorney, Agent, or Firm*—Mark E. Waddell; Stephen M. Haracz; Bryan Cave LLP

(57) ABSTRACT

The present invention provides an optically clear composition of fat soluble vitamins useful to fortify beverages. In addition, beverages which have been nutritionally supplemented using the optically clear composition of fat soluble vitamins are also provided for in the present invention. In particular compositions of vitamin E or vitamin E esters are provided.

5 Claims, No Drawings

VITAMIN E PREPARATIONS FOR BEVERAGE APPLICATIONS

This application claims benefit to U.S. Provisional Application Ser. No. 60/027,758 filed Oct. 7, 1996.

BACKGROUND OF THE INVENTION

The present invention relates to improvements in nutritious vitamin and mineral supplemented beverages which contain vitamin E and other fat soluble vitamins. In particular, methods for preparing beverages are provided as are beverages containing fat soluble vitamins formulations.

Vitamin supplements for human and veterinary use are commonplace. Some diets, or heavy physical exercise, may require the intake of considerable quantities of vitamins apart from those generally obtained through what otherwise would be considered a balanced diet.

Vitamin supplementation is also important, primarily for those who have inadequate diets, including growing children. In Central and South American countries where the dietary intake of vitamins are low in the general population, such vitamin supplement would have great value.

Sport beverages, such as, for example GATORADE, and vitamin supplemented waters, are beverages where the addition of vitamins is of interest. Also of interest are beverages used to restore electrolytes lost through diarrhea, for example, Pedialyte. Additionally, carbonated beverages, such as, for example, flavored seltzer waters, soft drinks or mineral drinks, as well as non-carbonated fruit juices, fruit punches and concentrated forms of these beverages.

One object of the present invention is to provide an optically clear composition of fat soluble vitamins which are present in a nutritionally supplemental amount that can be added to beverages. Another object of the present invention is that the optically clear composition does not alter the sensory properties of the beverage to which it is added and that the composition is stable in the finished beverage (for example, no ringing or surface filming). Another object of the present invention is to provide a beverage containing the optically clear composition of fat soluble vitamins which are present in a nutritionally supplemental amount.

Yet another object of the present invention is to provide an optically clear composition of vitamin E that can be added to beverages so that the amount of vitamin E is present in a nutritionally supplemental amount, typically from about 1 to about 30 milligrams/serving, serving being eight (8) ounces (or about 240 milliliters).

Yet another object of the present invention is to provide beverages and beverage concentrates which contain the optically clear composition of fat soluble vitamins which are present in a nutritionally supplemental amount.

SUMMARY OF THE INVENTION

The present invention relates to a vitamin supplement which comprises (A) (1) a fat soluble vitamin together with (2) an emulsifier which is then mixed into (B) a liquid to form an optically clear solution. The ratio of (1) to (2) is from about 1:1 to about 1:19 and the ratio of (A) to (B) is from about 1:0.5 to about 1:16. Preferably, the ratio of (1) to (2) is from about 1:1 to about 1:9, more preferably from about 1:1 to about 2:3, and most preferably about 2:3. Preferably, the fat soluble vitamin is selected from the group consisting of vitamin E or its esters, vitamin A or its esters, vitamin K, and vitamin D3 and mixtures thereof. More preferably, the fat soluble vitamin is vitamin E and its esters.

The emulsifier is preferably a non-ionic surfactant having good hydrophilic (strong affinity to water) and lipophilic (strong affinity to dispersed phase) characteristics. Additionally, the emulsifier should be GRAS (generally recognized as safe) or an approved material for food consumption as determined by the various regulatory agencies world wide.

The present invention is also directed to beverages containing the optically clear composition of fat soluble vitamins which are present in a nutritionally supplemental amount. Typical beverage or beverage concentrate compositions comprise at least about 0.05% by weight of fruit or cola flavor or at least about 3% by weight of fruit juice, a nutritionally supplemental amount of fat soluble vitamins added as an optically clear composition, water if necessary to bring the weight of the beverage to 100%, and optionally, a sweetener.

These beverages can be carbonated beverages e.g., flavored seltzer waters, soft drinks or mineral drinks, as well as non-carbonated fruit juices, fruit punches and concentrated forms of these beverages.

By way of example, the fruit juices and fruit flavors used herein include grape, pear, passion fruit, pineapple, banana or banana puree, apricot, orange, lemon, grapefruit, apple, cranberry, tomato, mango, papaya, lime, tangerine, cherry, raspberry, carrot and mixtures thereof.

Additionally, artificial flavors, e.g. cola, or natural flavors derived from these juices can be used in the beverages. Chocolate flavors and other non-fruit flavors can also be used to make beverages.

Beverages, especially juice and cola beverages, which are carbonated in the manner of soft drinks, as well as "still" beverages and also contemplated are nectars and full-strength beverages or beverage concentrates which contain at least about 45% by weight of juice.

The liquid of (B) can be water, the beverage to be supplemented, as well as mixtures thereof.

DETAILED DESCRIPTION OF THE INVENTION

The present invention relates to a vitamin supplement which comprises (A) (1) a fat soluble vitamin together with (2) an emulsifier which is then mixed into (B) a liquid to form an optically clear solution. The ratio of (1) to (2) is from about 1:1 to about 1:19 and the ratio of (A) to (B) is from about 1:0.5 to about 1:16. Preferably, the ratio of (1) to (2) is from about 1:1 to about 1:9, more preferably from about 1:1 to about 2:3, and most preferably about 2:3. Preferably, the fat soluble vitamin is selected from the group consisting of vitamin E or its esters, vitamin A or its esters, vitamin K, and vitamin D3 and mixtures thereof. More preferably, the fat soluble vitamin is vitamin E and its esters.

The emulsifier is preferably a non-ionic surfactant having good hydrophilic (strong affinity to water) and lipophilic (strong affinity to dispersed phase) characteristics. Additionally, the emulsifier should be GRAS (generally recognized as safe) or an approved material for food consumption as determined by the various regulatory agencies world wide. As an emulsifier, polyoxyethylene (20) sorbitan mono-oleate is a preferred material. It is also known as polysorbate 80 and is available commercially from, among other sources, ICI as Tween 80.

As fat soluble vitamins, vitamin E or its esters (for example, vitamin E acetate), vitamin A or its esters (for example, vitamin A acetate and vitamin A palmitate), vitamin K (phytomenadione) and vitamin D3 (cholecalciferol) are contemplated in the present invention. Vitamin E or its esters is the preferred fat soluble vitamin, with vitamin E acetate being most preferred.

The present invention is also directed to beverages containing the optically clear composition of fat soluble vitamins which are present in a nutritionally supplemental amount. Typical beverage or beverage concentrate compositions comprise at least about 0.05% by weight of fruit or cola flavor or at least about 3% by weight of fruit juice, a nutritionally supplemental amount of fat soluble vitamins added as an optically clear composition, water if necessary to bring the weight of the beverage to 100%, and optionally, a sweetener.

These beverages can be carbonated beverages e.g., flavored seltzer waters, soft drinks or mineral drinks, as well as non-carbonated fruit juices, fruit punches and concentrated forms of these beverages.

By way of example, the fruit juices and fruit flavors used herein include grape, pear, passion fruit, pineapple, banana or banana puree, apricot, orange, lemon, grapefruit, apple, cranberry, tomato, mango, papaya, lime, tangerine, cherry, raspberry, carrot and mixtures thereof.

Additionally, artificial flavors, e.g. cola, or natural flavors derived from these juices can be used in the beverages. Chocolate flavors and other non-fruit flavors can also be used to make beverages containing the vitamin and mineral supplement.

Beverages, especially juice and cola beverages, which are carbonated in the manner of soft drinks, as well as "still" beverages and also contemplated are nectars and full-strength beverages or beverage concentrates which contain at least about 45% by weight of juice.

Additionally, milk, obtained from cows or synthetic, is a contemplated beverage to which the optically clear composition of fat soluble vitamins can be added.

The liquid of (B) can be water, the beverage to be supplemented, as well as mixtures thereof.

As used herein, the term "fruit juice product" refers to both fruit juice beverages and fruit juice concentrates which comprise at least about 45% fruit juice.

Sport beverages are also contemplated as beverages which can be supplemented by the optically clear composition of fat soluble vitamins of the present invention. Typical sport beverages contain water, sucrose syrup, glucose-fructose syrup, and natural or artificial flavors. These beverages can also contain citric acid, sodium citrate, monopotassium phosphate, as well as other materials which are useful in replenishing electrolytes lost during perspiration.

As used herein, the term "fruit juice beverage" refers to a fruit juice product which is in a single-strength, ready-to-serve, drinkable form. Fruit juice beverages of the present invention can be of the "full-strength" type which typically comprise at least about 95% fruit juice.

Full strength fruit juice beverages also include those products of 100% fruit juice such as, for example, orange, apple, raspberry, cherry, apricot, pear, grapefruit, grape, lime, tangerine, carrot, pineapple, cranberry, tomato, and various mixtures thereof.

Fruit juice beverages also include extended juice products which are referred to as "nectars". These extended juice products typically comprise from about 50% to about 90% fruit juice, preferably, from about 50% to about 70% fruit juice. Nectars usually have added sugars or artificial sweeteners or carbohydrate substitutes.

As used herein, the term "fruit juice concentrate" refers to a fruit juice product which, when diluted with the appropriate amount of water, forms drinkable fruit juice beverages. Fruit juice concentrates within the scope of the present invention are typically formulated to provide drinkable beverages when diluted with 3 to 5 parts by weight water.

As used herein the term "beverage concentrate" or "beverage syrup" refers to a mixture of flavors, water and from about 10% to about 60% sugar or carbohydrate substitute, i.e. sucrose, dextrose, corn syrup solids, fructose, dextrins, polydextrose and mixtures thereof.

As used herein, the term "fruit juice materials" refers to concentrated fruit juice, plus other fruit juice materials such as fruit juice aroma and flavor volatiles, peel oils, and pulp or pomace.

As used herein, the term "citrus juice" refers to fruit juices selected from orange juice, lemon juice, lime juice, grapefruit juice, tangerine juice and mixtures thereof.

The flavor component of the beverages and beverage concentrates contains flavors selected from fruit flavors, botanical flavors and mixtures thereof. As used herein, the term "fruit flavor" refers to those flavors derived from the edible reproductive part of a seed plant, especially one having a sweet pulp associated with the seed. Also included within the term "fruit flavor" are synthetically prepared flavors made to simulate fruit flavors derived from natural sources. Particularly preferred fruit flavors are the citrus flavors including orange, lemon, lime and grapefruit flavors. Besides citrus flavors, a variety of other fruit flavors can be used such as apple, grape, cherry, pineapple, mango and papaya flavors and the like. These fruit flavors can be derived from natural sources such as fruit juices and flavor oils, or can be synthetically prepared.

As used herein, the term "botanical flavor" refers to flavors derived from parts of a plant other than the fruit; i.e. derived from nuts, bark, roots and leaves. Also included within the term "botanical flavor" are synthetically prepared flavors made to simulate botanical flavors derived from natural sources. Examples of such flavors include cola, tea, and the like. Botanical flavors can be derived from natural sources such as essential oils and extracts, or can be synthetically prepared.

The flavor component can comprise a blend of various flavors, e.g. lemon and lime flavors, cola flavors and citrus flavors to form cola flavors, etc. If desired, fruit juices such as orange, lemon, lime, apple, grape and like juices can be used in the flavor component. The flavors in the flavor component are sometimes formed into emulsion droplets which are then dispersed in the beverage concentrate. Because these droplets usually have a specific gravity less than that of water and would therefore form a separate phase, weighting agents (which can also act as clouding agents) are typically used to keep the emulsion droplets dispersed in the beverage. Examples of such weighting agents are brominated vegetable oils (BVO) and rosin esters, in particular the ester gums. See L. F. Green, Developments in Soft Drinks Technology, Vol. 1, (Applied Science Publishers Ltd. 1978), pp. 87–93, for a further description of the use of weighting and clouding agents in liquid beverages. Besides weighting agents, emulsifiers and emulsion stabilizers can be used to stabilize the emulsion droplets. Examples of such emulsifiers and emulsion stabilizers include the gums, pectins, celluloses, polysorbates, sorbitan esters and propylene glycol alginates. See L. F. Green, supra at p. 92.

The particular amount of the flavor component effective for imparting flavor characteristics to the beverages and beverage concentrates ("flavor enhancing") can depend upon the flavor(s) selected, the flavor impression desired, and the form of the flavor component. The flavor component can comprise at least 0.05% by weight of the beverage composition, and typically from 0.1 % to 2% by weight for carbonated beverages. When fruit juices are used as the flavor, the flavor component can comprise, on a single-strength basis, up to 25% fruit juice by weight of the beverage, preferably from 5% to 15% fruit juice by weight for carbonated beverages.

Carbon dioxide can be introduced into the water which is mixed with the beverage syrup or into the drinkable beverage after dilution to achieve carbonation. The carbonated beverage can be placed into a container such as a bottle or can and then sealed. Any conventional carbonation methodology can be used to make the carbonated beverages of this invention.

The amount of carbon dioxide introduced into the beverage will depend upon the particular flavor system used and the amount of carbonation desired. Usually, carbonated beverages of the present invention contain from 1.0 to 4.5 volumes of carbon dioxide. The preferred carbonated beverages contain from 2 to about 3.5 volumes of carbon dioxide.

The present invention is also particularly suited for the supplementation of beverages and beverage concentrates, including citrus juices. The beverages can contain from 3% to 100% juice or from about 0.05% to about 10% of an artificial or natural flavor, particularly orange juice. The concentrated orange juice, orange juice aroma and flavor volatiles, pulp and peel oils used in the method of the present invention can be obtained from standard orange juice. See Nagy et al, Citrus Science and Technology, Volume 2, (AVI Publishing Co. 1977), pp 177–252 for standard processing of oranges, grapefruit and tangerines. (See also Nelson et al, Fruit and Vegetable Juice Processing Technology (3rd Ed., AVI Publishing 1980),pp. 180–505 for standard processing of noncitrus juices such as apple, grape, pineapple, etc. to provide sources of juice and juice materials for noncitrus juice products).

Juices from different sources are frequently blended to adjust the sugar to acid ratio of the juice. Different varieties of oranges can be blended or different fruit juices can be blended to get the desired flavor and sugar to acid ratio. A sugar to acid ratio of from about 8:1 to about 20:1 is considered acceptable for fruit juices. However, preferred sugar to acid ratios are typically from about 11:1 to about 15:1, especially for citrus juices Sweeteners include the sugars normally present in fruit juice products, for example glucose, sucrose, and fructose. Sugars also include high fructose corn syrup, invert syrup, sugar alcohols, including sorbitol, refiners syrup, and mixtures thereof.

In addition to sugar, extended fruit juice beverages of the present invention can contain other sweeteners. Other suitable sweeteners include saccharin, cyclamates, acetosulfam, L-aspartyl-L-phenylalanine lower alkyl ester sweeteners (e.g. aspartame). A particularly preferred sweetener for use in such extended juice products is aspartame.

For single-strength fruit juice beverages, the sugar content can range from about 2° to about 16° Brix. Typically, the sugar content of such beverages depends upon the amount of fruit juice contained herein. For full-strength beverages containing at least about 95% fruit juice, the sugar content is typically from about 5° to about 14° Brix. For extended juice beverages which comprise from about 50% to about 90% fruit juice, the sugar content is typically from about 5° to about 13° Brix (no other sweetener) or from about 2° to about 8° Brix (other sweetener containing). For fruit juice concentrates according to the present invention, the sugar content can range from about 6° to about 75° Brix. Typically, the sugar content of these juice concentrates is from about 20° to about 50° Brix. For orange juice concentrates, the sugar content is preferably from about 35° to about 50° Brix.

The amount of the sweetener effective in the beverages of the invention depends upon the particular sweetener used and the sweetness intensity desired. For noncaloric sweeteners, this amount varies depending upon the sweetness intensity of the particular sweetener. For sugar, this amount can be from 1% to 14% (typically from 6% to 14%) by weight for carbonated beverages. Preferred beverages contain from 9% to 13% by weight sugar. In determining the amount of sugar for beverages of the present invention, any sugar or other sweetener present in the flavor component, such as in fruit juice, is also included. Low-calorie sweetener combinations containing a noncaloric sweetener such as aspartame and a sugar such as high fructose corn syrup can also be used in beverages. For beverage syrups, the amount of sugar in a beverage syrup is from about 10% to about 60%, and preferably from about 40% to about 60%.

The various beverage and beverage concentrates can be packaged in conventional packages for the particular beverage or beverage concentrates which are nutritionally supplemented by the optically clear composition of fat soluble vitamins. In some instances, the concentrates are frozen.

The optically clear composition of the invention can be made by mixing the fat soluble vitamin and the emulsifier, in conventional mixing apparatus, at a temperature between about room temperature (~22° C.) and about 90° C., preferably between about 35° C. and 45° C., so as to form a homogeneous mixture. This homogeneous mixture is then allowed to cool to room temperature The cooled mixture is then mixed with water at a temperature of from about 30° C. to about 35° C., the ratio of the mixture to water being from about 1:0.5 to about 1:16. A preferred ratio range of mixture to water is from about 1:1 to about 1:9. When the composition and water are mixed, a gel-like to fluid mixture is formed. While not being restricted to this theory, it is thought that the mixture has liquid crystal and liposome tendencies.

Additionally, instead of mixing the cooled mixture in water as described above, the cooled mixture could also be mixed into an appropriate amount of the beverage which is to be fortified in a like manner as described above. Such amount of beverage could then be used as a concentrate. Should the cooled mixture be added to water or to the beverage to be used as a concentrate, the resulting mixture should be pasteurized to avoid microbial spoilage. Such pasteurization methods are well known to those of ordinary skill in the art.

The following examples served to demonstrate the present invention.

EXAMPLE 1 (Control)

A. Formulation

Vitamin E acetate (4 grams) and Polysorbate 80 (polyoxyethylene (20) sorbitan mono-oleate; 6 grams) were mixed in a suitable container and heated to about 40° C. to give a homogeneous mixture. The mixture was used for beverage fortification for the following beverages, Gatorade Lemon Ice and apple juice, as follows.

B. Fortification 250 mg of the formulation A, containing 100 mg of vitamin E acetate, was dispersed in a sample of each of the aforementioned beverages to form a 100 g stock solution of each beverage. 1.25 g, 2.50 g or 3.75 g of the stock solution of each beverage was placed into a beaker. Into the respective beakers were placed 28.75 g, 27.50 g or 26.25 g of each of the respective beverages. Each beaker was stirred to disperse the materials therein to form beverages containing 1.25 mg, 2.50 mg and 3.75 mg of vitamin E acetate per 30 g of beverage. Turbidity of the beverages was measured using a nephelometer (Monitek, Model TA 1).

EXAMPLE 2 (Inventive Formulation)

A. Formulation

Step 1. Vitamin E acetate (4 grams) and Polysorbate 80 (polyoxyethylene (20) sorbitan mono-oleate; 6 grams) were mixed in a suitable container and heated to about 40° C. to give a homogeneous mixture.

Step 2. The above mixture of Step 1(5 grams) and water (5 grams) were mixed is and stirred at about 30–35° C. until the mixture became gel-like. This mixture was used for beverage fortification for the following beverages, Gatorade Lemon Ice and apple juice, as follows.

B. Fortification

The formulations in A, containing 100 mg of vitamin E acetate, was dispersed in a sample of each of the aforementioned beverages to form a 100 g stock solution of each beverage. 1.25 g, 2.50 g or 3.75 g of the stock solution of each beverage was placed into a beaker. Into the respective beakers were placed 28.75 g, 27.50 g or 26.25 g of each of the respective beverages. Each beaker was stirred to disperse the materials therein to form beverages containing 1.25 mg, 2.50 mg and 3.75 mg of vitamin E acetate per 30 g of beverage. Turbidity of the beverages was measured as described above. The optical clarity results for the beverages of Examples 1 and 2 are shown in Table 1.

TABLE 1

| Beverage | Examples | Turbidity, NTU* | | |
|---|---|---|---|---|
| | | 1.25 mg | 2.50 mg | 3.75 mg |
| Gatorade Lemon Ice | 1 | 27 | 50 | 76 |
| | 2 | 5.6 | 6.8 | 7.3 |
| Apple Juice | 1 | 14.2 | 29 | 45 |
| | 2 | 2.2 | 2.3 | 3.4 |

*A NTU value of 10 or less is considered to be optically clear.

As can be seen from Table 1, the beverages fortified with the formulation of the present invention were much less turbid than beverages fortified with the control formulation.

EXAMPLE 3

A. Formulation

Step 1. Vitamin E acetate (4 grams) and Polysorbate 80 (polyoxyethylene (20) sorbitan mono-oleate; 6 grams) were mixed in a suitable container and heated to about 40° C. to give a homogeneous mixture.

Step 2. The above mixture was mixed with water in various proportions and stirred at 30–35° C. for about 5 minutes or until the mixtures became gel-like. These mixtures were used for beverage fortification of Gatorade Lemon Ice.

B. Fortification

The formulations in A, containing 100 mg of vitamin E acetate, were dispersed in a sample of the aforementioned beverage to form a 100 g stock solutions thereof. 1.25 g or 2.50 g of each of the stock solutions of the beverage were placed into a beaker. Into the respective beakers were placed 28.75 g or 27.50 g of the beverage. Each beaker was stirred to disperse the materials therein to form beverages containing 1.25 mg or 2.50 mg of vitamin E acetate per 30 g of beverage.

The results are shown in Table 2.

TABLE 2

| Ratio of (vitamin E/polysorbate) to water | Turbidity, NTU* | |
|---|---|---|
| | 1.25 mg | 2.50 mg |
| 1/0.25 | 14.6 | 26 |
| 1/0.33 | 13.7 | 27 |
| 1/0.50 | 9.5 | 15.5 |
| 1/1 | 5.2 | 7.3 |
| 1/2 | 6.5 | 8.9 |
| 1/4 | 4.9 | 5.6 |
| 1/6 | 4.7 | 5.7 |
| 1/9 | 6.3 | 7.4 |
| 1/16 | 9.6 | 15.7 |
| 1/25 | 21 | 37 |
| 1/50 | 22 | 38 |
| 1/100 | 22 | 38 |
| 1/200 | 23 | 40 |
| 1/400 | 27 | 46 |

*A value of NTU of 10 or less is considered to be optically clear.

EXAMPLE 4

The stability of an inventive formulation, comprising 20% vitamin E acetate, 30% Tween 80 (polyoxyethylene (20) sorbitan mono-oleate), and 50% water, was evaluated at room temperature (RT, ~22° C.). The formulation was made in the same manner as other formulations of the present invention as above and was placed into a suitable container for stability evaluation. The results of the stability evaluation are shown in Table 4 below.

TABLE 3

| Lot # | % Retention at RT* | | |
|---|---|---|---|
| | Initial (IU/gram) | 1.5 months | 3 months |
| 1 | 95.0 (195) | 108 (216) | 105 (209) |
| 2 | 93.5 (187) | 104 (208) | 117 (235) |

*Based on the claim, which is 200 IU of vitamin E/gram

EXAMPLE 5

The chemical and physical stability, as measured by percent vitamin E retention, presence or absence of ringing or precipitation, and optical clarity, of the formulation of Example 4 was evaluated in a variety of beverages. The results of the evaluation is shown in Table 4 below. The formulation was incorporated into the various beverages in a manner as described in Example 2 above.

TABLE 4

| Beverage Type | Fortification Level (mg/240 ml) | Vit. E Retention (%) | | | | | | Ringing or precipitation after 6 mo storage | | Optical Clarity* NTU 6 Months | |
|---|---|---|---|---|---|---|---|---|---|---|---|
| | | Initial | 1 Month | | 3 Months | | 6 Months | | | | Initial | RT |
| | | | 5° C. | RT | 5° C. | RT | 5° C. | RT | 5° C. | RT | | |
| Gatorade Lemon Ice | 10 | 104 | 95 | 93 | 112 | 106 | 96 | 97 | No | No | 5.6 | 6.4 |
| Gatorade Lemon Ice | 20 | 104 | 99 | 101 | 104 | 100 | 101 | 101 | No | No | 7.6 | 8.6 |
| Gatorade Lemon Lime | 10 | 116 | 107 | 105 | 119 | 121 | 111 | 110 | No | No | 111 | 114 |
| Gatorade Lemon Lime | 20 | 114 | 109 | 105 | 110 | 110 | 109 | 117 | No | No | 110 | 117 |
| Gatorade Orange | 10 | 112 | 97 | 97 | 112 | 106 | 102 | 101 | No | No | 115 | 120 |
| Gatorade Orange | 20 | 105 | 98 | 99 | 103 | 104 | 97 | 103 | No | No | 114 | 117 |
| Lucky Leaf Apple Juice | 10 | 108 | 111 | 107 | 102 | 102 | 93 | 94 | No | No | 5.3 | ** |
| Lucky Leaf Apple Juice | 20 | 107 | 104 | 104 | 101 | 101 | 94 | 96 | No | No | 7.8 | ** |

* Initial (final) optical clarity: Lemon Ice: 4.7 (4.9); Lemon Lime: 108 (109); Orange: 113 (113)
** not determined
Fortification Level is mg of vitamin E acetate per 240 ml of beverage.

The beverage or beverage concentrates supplemented with the optically clear composition of fat soluble vitamins of the present invention can be made by conventional means well known to those of ordinary skill in the art. In general, the optically clear composition of fat soluble vitamins can be incorporated into the beverage or beverage concentrates or syrups in the same manner in which the optically clear composition of fat soluble vitamins have been added in the above examples.

The beverage concentrates and syrups to which the optically clear composition of fat soluble vitamins have been added can be used to make final single strength beverage by blending the concentrate or syrup with an appropriate amount of water, usually about 1 part concentrate or syrup to abut 3 to 4 parts of water. In some instances, the water can either be carbonated or non-carbonated.

Examples of other beverages to which the optically clear composition of fat soluble vitamins can be added in nutritionally supplemental amounts include:

(a) "sparkling" orange juice comprising 55% orange juice and 45% carbonated water;
(b) pear-grapefruit nectar comprising 25% pear juice, 20% grapefruit juice, the balance comprising 10% sucrose-water;
(c) kiwi-grapefruit drink comprising 20% kiwi fruit juice, 15% grapefruit juice, the balance comprising water;
(d) mixed fruit "cocktail" comprising 10% each of the juices of passion fruit, mango, guava, pineapple, papaya, banana, apricot, mandarin orange, pear and lime juices;
(e) yogurt/fruit beverage comprising 20% milk products, 1% pectin, 20% pineapple juice, 10% shredded pineapple fruit pulp, 16% corn syrup, the balance comprising water;
(f) cola beverage comprising 0.35% cola flavor emulsion, 11% sugar, 0.1% phosphoric acid, 0.1% citric and malic acids, caramel coloring, the balance comprising carbonated water;
(g) full-strength orange juice;
(h) full-strength apple juice;
(i) full-strength flavored cow's milk.

What is claimed is:

1. An optically clear vitamin E dietary supplement consisting essentially of:
   (A) (1) vitamin E or an ester thereof; and
       (2) an emulsifier which is polyoxyethylene (20) sorbitan mono-oleate, the ratio of (1) to (2) being from about 1:1 to about 1:9 by weight, and
   (B) a liquid,
       wherein the ratio of (A) to (B) is from about 1:1 to about 1:9 by weight.

2. The supplement of claim 1 wherein (A)(1) is vitamin E acetate.

3. The supplement of claim 1 wherein (B) is water.

4. The supplement of claim 3 wherein the ratio of (A)(1) to (A)(2) is from about 1:1 to about 2:3.

5. The supplement of claim 4 wherein the ratio of (A)(1) to (A)(2) is about 2:3.

* * * * *

UNITED STATES PATENT AND TRADEMARK OFFICE
CERTIFICATE OF CORRECTION

PATENT NO. : 6,180,130 B1  Page 1 of 1
DATED : January 30, 2001
INVENTOR(S) : Chyi-Cheng Chen, et al.

It is certified that error appears in the above-identified patent and that said Letters Patent is hereby corrected as shown below:

Title page,
Under (56) References Cited, one reference is missing. Therefore, please insert --
Green, L.F., "Developments in Soft Drinks Technology," Applied Science Publishers Ltd, London, Vol. 1, pp. 87-93 (1978) --

Signed and Sealed this

Seventh Day of August, 2001

Attest:

Attesting Officer

NICHOLAS P. GODICI
*Acting Director of the United States Patent and Trademark Office*